(12) United States Patent
Cheon (10) Patent No.: US 12,036,924 B2
(45) Date of Patent: Jul. 16, 2024

(54) AUTONOMOUS EMERGENCY BRAKING SYSTEM AND METHOD

(71) Applicant: HL Klemove Corp., Incheon (KR)

(72) Inventor: Seunghun Cheon, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 281 days.

(21) Appl. No.: 17/848,465

(22) Filed: Jun. 24, 2022

(65) Prior Publication Data
US 2022/0410801 A1 Dec. 29, 2022

(30) Foreign Application Priority Data
Jun. 29, 2021 (KR) ......................... 10-2021-0084524

(51) Int. Cl.
*B60Q 9/00* (2006.01)
*B60T 7/22* (2006.01)

(52) U.S. Cl.
CPC .............. *B60Q 9/008* (2013.01); *B60T 7/22* (2013.01); *B60T 2210/20* (2013.01); *B60T 2210/32* (2013.01); *B60T 2250/00* (2013.01); *B60T 2250/04* (2013.01)

(58) Field of Classification Search
CPC .... B60T 7/22; B60T 2210/20; B60T 2210/32; B60T 2250/00; B60T 2250/04
See application file for complete search history.

(56) References Cited

U.S. PATENT DOCUMENTS

| 6,157,294 | A | 12/2000 | Ural |
| 9,630,599 | B2 | 4/2017 | Kida |
| 11,333,767 | B2 | 5/2022 | Mei |
| 11,560,126 | B2* | 1/2023 | Diedrich .................. B60Q 9/00 |
| 2015/0371095 | A1* | 12/2015 | Hartmann ................. G06T 7/11 |
| | | | 348/148 |
| 2019/0126892 | A1 | 5/2019 | Lee |
| 2020/0094796 | A1* | 3/2020 | Diedrich .............. G05D 1/0088 |
| 2021/0284127 | A1* | 9/2021 | McKeown ............. B60T 8/171 |

FOREIGN PATENT DOCUMENTS

| DE | 69914815 | T2 | 1/2005 |
| DE | 102011112422 | A1 | 3/2013 |
| DE | 102015207038 | A1 | 10/2016 |
| DE | 102017100980 | A1 | 7/2018 |
| JP | 2002274344 | A | 9/2002 |
| JP | 2007210595 | A | 8/2007 |
| JP | 2010-163058 | A | 7/2010 |
| JP | 2014-104856 | A | 6/2014 |

OTHER PUBLICATIONS

Office Action issued in Germany Patent Application No. 102022116006.8 dated Oct. 30, 2023.

* cited by examiner

*Primary Examiner* — Ramsey Refai
(74) *Attorney, Agent, or Firm* — Harvest IP Law, LLP

(57) ABSTRACT

The present disclosure relates to an autonomous emergency braking system and a method. More specifically, the autonomous emergency braking system according to the present disclosure includes: a sensor that includes a gravity sensor detecting a force of gravity applied to a host vehicle and a vehicle-speed sensor detecting a vehicle speed of the host vehicle; an inclination determiner that determines an inclination of a road surface on which the host vehicle is traveling based on the vehicle speed of the host vehicle and the force of gravity; and a controller that adjusts an AEB warning time based on the determined inclination of the road surface.

12 Claims, 5 Drawing Sheets

AUTONOMOUS EMERGENCY BRAKING SYSTEM AND METHOD

CROSS-REFERENCE TO RELATED APPLICATION

This application claims priority from Korean Patent Application No. 10-2021-0084524, filed on Jun. 29, 2021, which is hereby incorporated by reference for all purposes as if fully set forth herein.

BACKGROUND OF THE INVENTION

Field of the Invention

Embodiments relate to an autonomous emergency braking system and a method.

Description of Related Art

In accordance with rapid developments of electronic control technologies, various devices and the like that have been operated using mechanical methods are driven using electrical methods also in vehicles for the purpose of convenience of drivers, safety of operations, and the like, and systems of vehicles become more sophisticated and state-of-the-art.

As an example thereof, a device known to have a great effect for avoiding a rear-end accident or a collision with a pedestrian or relieving damages is an Autonomous Emergency Braking (AEB) system.

In a conventional AEB system, only a flatland is mainly assumed, and thus it is difficult to accurately determine a braking distance of a host vehicle, and, if an object such as a preceding vehicle is present, it is difficult to determine a distance to the object only using a camera sensor, and accordingly, there is a disadvantage that it is difficult to perform a countermeasure thereof.

SUMMARY OF THE INVENTION

In such a background, the present disclosure is to provide an autonomous emergency braking system and a method for determining an inclination of an inclined road on which a host vehicle is traveling and adjusting an AEB warning time according to the inclination.

In order to solve the problems described, according to one aspect of the present disclosure, there is provided an autonomous emergency braking system including: a sensor that includes a gravity sensor detecting a force of gravity applied to a host vehicle and a vehicle-speed sensor detecting a vehicle speed of the host vehicle; an inclination determiner that determines an inclination of a road surface on which the host vehicle is traveling based on the vehicle speed of the host vehicle and the force of gravity; and a controller that adjusts an AEB warning time based on the determined inclination of the road surface. According to another aspect of the present disclosure, there is provided an autonomous emergency braking method including: detecting a force of gravity applied to a host vehicle and detecting a vehicle speed of the host vehicle; determining an inclination of a road surface on which the host vehicle is traveling based on the vehicle speed of the host vehicle and the force of gravity; and adjusting an AEB warning time based on the determined inclination of the road surface.

In an autonomous emergency braking system and a method according to the present disclosure, an inclination of an inclined road on which a host vehicle is traveling is determined, and an AEB warning time that is appropriate for the determined inclination is adjusted, whereby an efficient braking distance can be secured.

DETAILED DESCRIPTION OF THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

General Autonomous Emergency Braking (AEB) can detect an object through a camera sensor, determine a likelihood of a collision between the object and a vehicle, and, in a case where it is determined that the object and the vehicle will collide with each other, output an AEB warning and perform control according thereto.

Since a distance is determined using a camera sensor, in a case where the camera sensor incorrectly detects a distance to an object, the AEB may not be operated even if the distance to the object is short, or the AEB may be operated even if the distance to the object is long. In a case where the situation described above is repeated, it is inconvenient to drive the vehicle, and an accident may be caused.

Figure 1:
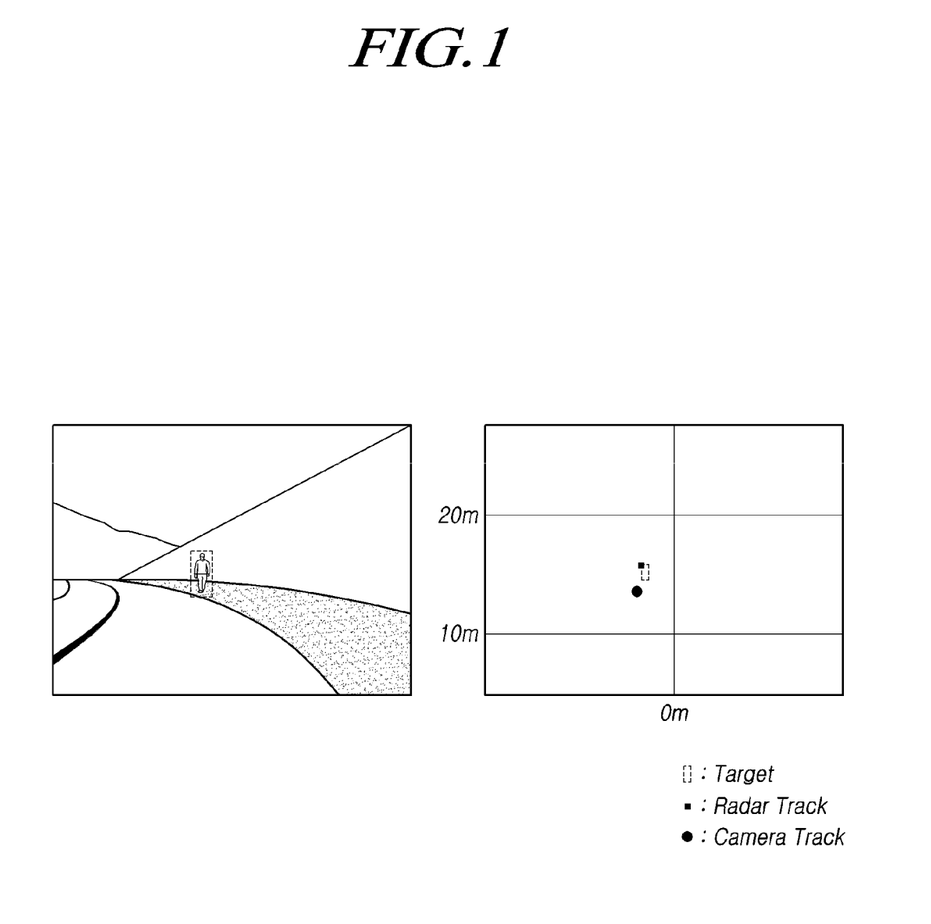
FIG. 1 is a diagram illustrating a camera sensor and a radar sensor according to one embodiment detecting an object on an inclined road and determining a distance.
Figure 2:
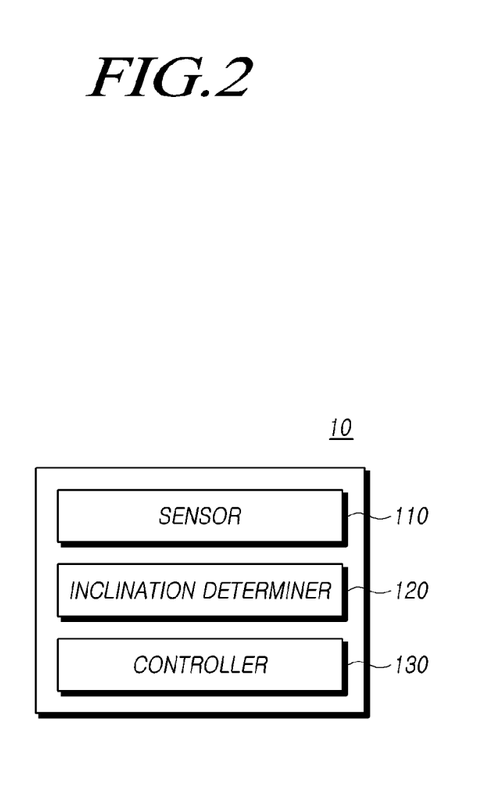
FIG. 2 is a block diagram illustrating an autonomous emergency braking system according to one embodiment of the present disclosure.

FIG. 1 represents distances acquired by detecting an object using a camera sensor and a radar sensor mounted to a vehicle on an inclined road. Referring to FIG. 1, the camera sensor recognizes a distance to an object (target) as being shorter than that recognized by the radar sensor on the inclined road. A distance in a longitudinal direction that is detected by the radar sensor has high reliability, and thus, if a distance detected by the radar sensor is assumed to be an actual distance, the camera sensor recognizes an object to be near than the actual distance.

In such a case, as described above, inconvenience in driving and an accident may be caused.

Hereinafter, in order to solve the problems described above, an autonomous emergency braking system (10) according to one embodiment of the present disclosure will be described with reference to the accompanying drawings.

FIG. 1 is a block diagram illustrating the autonomous emergency braking system (10) according to one embodiment of the present disclosure.

Referring to FIG. 1, the autonomous emergency braking system (10) according to one embodiment of the present disclosure may include a sensor (110), an inclination determiner (120), a controller (130), and the like.

The autonomous emergency braking system (10) according to one embodiment of the present disclosure may be an Advanced Driver Assistance System (ADAS) that is mounted in a host vehicle (20), provides information for assisting traveling of the host vehicle (20), and provides assistance to a driver's control of the host vehicle (20). Here, the host vehicle (20) may represent a vehicle that has a motor mounted thereon and is manufactured to move on the ground by rolling wheels using the power of the motor without using a railroad or installed lines. The host vehicle (20) may be an electric vehicle that uses electricity as power and obtains drive energy by rotating a motor using electricity accumulated in a battery without obtaining drive energy from combustion of fossil fuel.

The autonomous emergency braking system (10) may be applied to a manned vehicle having a driver to get in and control the host vehicle (20) or an autonomous traveling vehicle.

In addition, the autonomous emergency braking system (10) according to the present disclosure may be applied to a winding road.

The sensor (110) may include a gravity sensor that detects a force of gravity applied to the host vehicle (20) and a vehicle-speed sensor that detects a vehicle speed of the host vehicle (20).

In one embodiment, the gravity sensor may be used for implementation of Electronic Stability Control (ESC). The vehicle-speed sensor may be a wheel-speed sensor that detects a wheel speed of the host vehicle (20).

The gravity sensor may include a vehicle body gravity sensor, a wheel gravity sensor, and the like and detect a force of gravity applied to the host vehicle (20) using each of the sensors. The vehicle-speed sensor may detect a vehicle speed of the host vehicle (20) by detecting a wheel rotation speed of the host vehicle (20).

The inclination determiner (120) may determine an inclination of a road surface on which the host vehicle (20) is traveling based on a vehicle speed of the host vehicle (20) and a force of gravity. Here, the inclination may be determined by comparing a value of a force of gravity detected by the gravity sensor with a differential value of a vehicle speed detected by the vehicle-speed sensor. For example, by comparing a value of a force of gravity detected by a wheel gravity sensor mounted to a front wheel of the host vehicle (20) with a value of a force of gravity detected by a wheel gravity sensor mounted to a rear wheel of the host vehicle (20), the inclination of the road surface on which the host vehicle (20) is traveling may be determined.

The controller (130) may adjust an AEB warning time based on the determined inclination of the road surface.

Referring to Table 1 represented below, an object (30) detected by a camera sensor mounted to the host vehicle (20) may have a different detected distance in accordance with the inclination.

TABLE 1

| | Inclined road | TTC error | 1st | 2nd | 3rd | 4th | 5th |
|---|---|---|---|---|---|---|---|
| Camera | Steep upward inclination + 12% (7°) | −0.25 seconds | 0.0 | −0.21 | −0.21 | −0.25 | −0.23 |
| | Gentle upward inclination + 3.5% (2°) | −0.05 seconds | −0.05 | +0.02 | +0.01 | +0.02 | +0.03 |
| | Gentle downward inclination −5.2% (−3°) | +0.04 seconds | 0.0 | +0.01 | 0.0 | +0.04 | +0.02 |
| | Steep downward inclination −12% (−7°) | +0.04 seconds | 0.0 | +0.01 | 0.0 | +0.02 | +0.04 |

Referring to Table 1, it can be checked that a TTC error is determined to be −0.25 seconds at an upward inclination of 7 degrees, a TTC error is determined to be −0.05 seconds at an upward inclination of 2 degrees, and a TTC error at a downward inclination of −3 degrees is determined to be +0.04 seconds. In other words, as represented in FIG. 1, the camera sensor may detect the object (30) nearer at an upward inclination than a distance to the object (30) detected by the radar sensor as a reference, and the camera sensor may detect the object (30) farther at a downward inclination than the distance detected by the radar sensor.

Thus, the controller (130) may adjust the AEB warning time to be delayed further as the determined inclination of the road surface becomes higher and may adjust the AEB warning time to be advanced further as the determined inclination of the road surface becomes lower.

The controller (130) may classify the determined inclination of the road surface into one section among a plurality of inclination sections and perform adjustment to an AEB warning time corresponding to the classified section.

For example, the controller (130) may classify an upward inclination section into five sections by referring to Table 2 represented below.

TABLE 2

| Section | 1st | 2nd | 3rd | 4th | 5th |
|---|---|---|---|---|---|
| Inclination (%) | 0-3 | 3-5 | 5-7 | 7-9 | 9- |
| AEB warning [sec] | 0 | −0.1 | −0.15 | −0.2 | −0.25 |
| AEB braking {sec} | 0 | −0.05 | −0.1 | −0.15 | −0.2 |

In a case where the determined inclination is an upward inclination of 4%, the controller (130) may determine the second section and adjust the AEB warning time to −0.1 seconds that is an AEB warning time corresponding to the second section. In accordance with this, AEB braking may be delayed by −0.05 seconds.

The plurality of sections described above is one example and may be applied also to downward inclinations, and an inclination range for each section may be set narrower or broader in accordance with the purpose thereof.

According to the description presented above, the autonomous emergency braking system (10) can perform appropriate braking for avoiding an object (30) predicted to collide with the vehicle by determining an inclination and adjusting the AEB warning time in accordance with the inclination.

Figure 3:
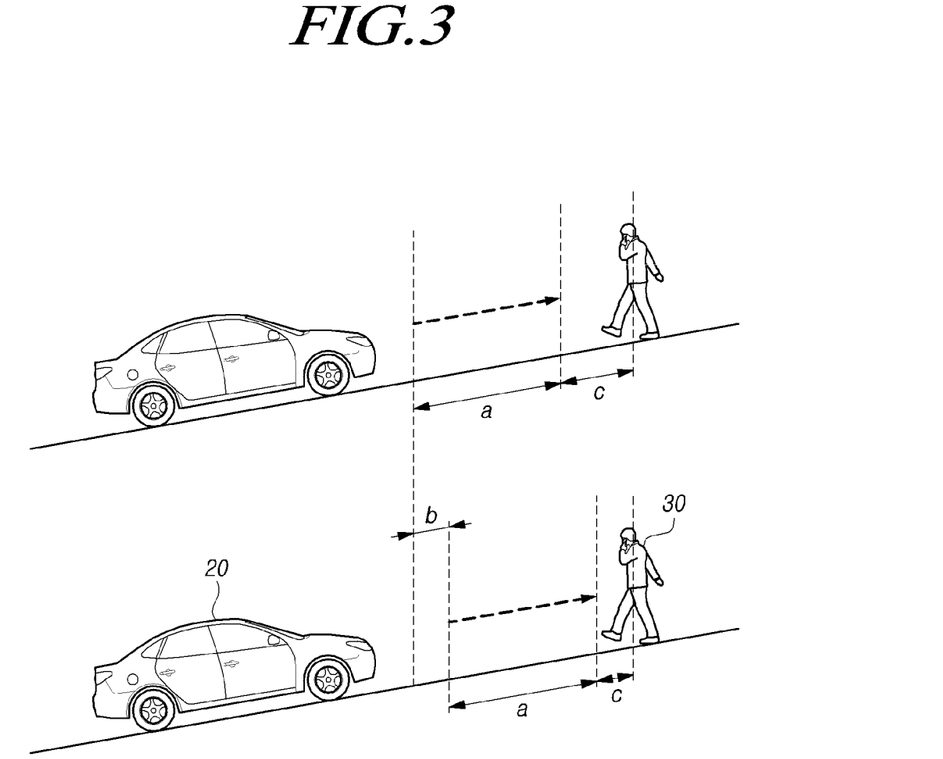
FIG. 3 is a diagram illustrating a stopping distance according to adjustment of an AEB warning time according to one embodiment.

FIG. 3 is a diagram illustrating a stopping distance according to adjustment of an AEB warning time according to one embodiment.

Referring to FIG. 3, in a case where a likelihood of a collision of the host vehicle (20) with an object (30) is equal to or higher than a threshold point, the autonomous emergency braking system (10) outputs an AEB warning and performs AEB braking. In such a case, a distance until stopping after the AEB braking is performed may be represented as a. A stopping distance c may represent a distance between a position at which the host vehicle (20) stops in accordance with AEB braking and the object (30).

Here, in a case where it is determined that the host vehicle (20) is traveling on an inclined road, the controller (130) may determine an inclination of the road surface and adjust the AEB warning according to the inclination. In a case where the inclination of the road surface is determined as an upward inclination, the controller (130) may delay the AEB warning by b illustrated in FIG. 3. In accordance with this, the stopping distance c may be shortened.

Referring to Table 3 represented below, it can be checked that the stopping distance is improved from 4.16 m to 3.36 m as a result of delaying the AEB warning in accordance with an upward inclination condition by adjusting the AEB warning time in accordance with the present disclosure.

TABLE 3

| Inclination | Application/ No n-application | Stopping distance | 1st | 2nd | 3rd | 4th | 5th |
|---|---|---|---|---|---|---|---|
| Upward inclination 10% | Before application | Actual distance 4.16 m | 4.0 m | 4.5 m | 4.1 m | 3.9 m | 4.3 m |
| | | Camera tracking distance 3.62 m | 3.3 m | 4.0 m | 3.7 m | 3.3 m | 3.8 m |
| | After application | Actual distance 3.36 m | 3.3 m | 3.3 m | 3.6 m | 3.3 m | 3.3 m |
| | | Camera tracking distance 2.56 m | 2.6 m | 2.7 m | 2.5 m | 2.4 m | 2.6 m |

In a case where a likelihood of collision of the object (30) with the host vehicle (20) is equal to or higher than the threshold point, the controller (130) may adjust the AEB warning time. For this, the sensor (110) may further include an image sensor detecting an object (30) that is present in the vicinity of the host vehicle (20). Here, for example, the image sensor may be a camera sensor.

According to the description presented above, by determining an inclination of a road surface on which the host vehicle (20) is traveling and adjusting the AEB warning time in a situation in which a collision is predicted, a more accurate stopping distance can be maintained.

Such a controller (130) may be implemented by an electronic control unit (ECU), a microcomputer, or the like.

In one embodiment, the controller (130) may be implemented by an electronic control unit (ECU). The electronic control unit may include one or more processors and at least one or more elements among a memory, a storage, a user interface inputter, and a user interface outputter, and these may communicate with each other through a bus. In addition, a computer system may further include a network interface used for connection to a network. The processor may be a CPU or a semiconductor element that executes processing commands stored in a memory and/or a storage place. The memory and the storage may include a variety types of volatile/nonvolatile storage media. For example, the memory may include a ROM and a RAM.

Hereinafter, an autonomous emergency braking method using the autonomous emergency braking system (10) that can perform all the disclosures described above will be described.

Figure 4:
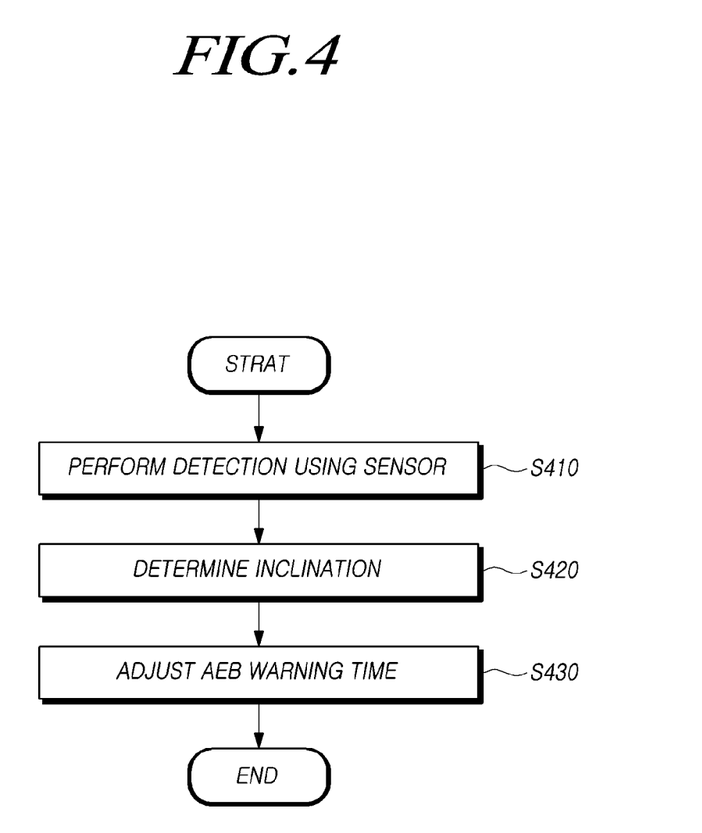
FIG. 4 is a flowchart illustrating an autonomous emergency braking method according to one embodiment of the present disclosure.

FIG. 4 is a flowchart illustrating an autonomous emergency braking method according to one embodiment of the present disclosure.

Referring to FIG. 4, the autonomous emergency braking method according to the present disclosure may include: a sensor detecting step (S410) of detecting a force of gravity applied to a host vehicle (20) and detecting a vehicle speed of the host vehicle (20); an inclination determining step (S420) of determining an inclination of a road surface on which the host vehicle (20) is traveling based on the vehicle speed of the host vehicle (20) and the force of gravity; and an AEB warning time adjusting step (S430) of adjusting an AEB warning time based on the determined inclination of the road surface.

Here, the inclination may be determined by comparing a value of a force of gravity detected by the gravity sensor with a differential value of a vehicle speed detected by the vehicle-speed sensor.

In the AEB warning time adjusting step (S430) for adjustment, in a case where a likelihood of a collision of an object (30) with the host vehicle (20) is equal to or higher than a threshold point, the AEB warning time may be adjusted. For this, in the sensor detecting step (S410), objects (30) present in the vicinity of the host vehicle (20) may be further detected.

In the AEB warning time adjusting step (S430) for adjustment, the AEB warning time may be adjusted to be delayed further as the determined inclination of the road surface becomes higher.

In the AEB warning time adjusting step (S430) for adjustment, the AEB warning time may be adjusted to be advanced further as the determined inclination of the road surface becomes lower.

Figure 5:
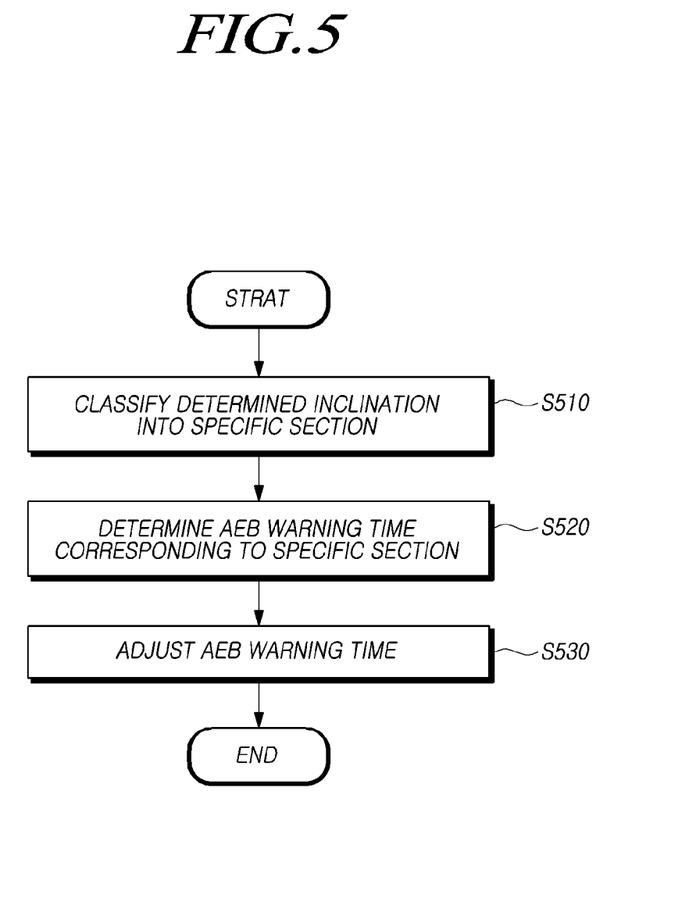
FIG. 5 is a flowchart illustrating Step S430 according to one embodiment more specifically.

FIG. 5 is a flowchart illustrating Step S430 according to one embodiment more specifically.

Referring to FIG. 5, the autonomous emergency braking system (10) may classify determined inclinations into specific sections (S510). The autonomous emergency braking system (10) may set a plurality of sections such that the AEB warning time is operated similarly to the case of a flatland in accordance with the inclination. For example, such sections may be classified into five sections of Table 3 described above or may be set into less sections or more sections in accordance with the purpose. The autonomous emergency braking system (10) may determine an AEB warning time corresponding to a specific section (S520).

The autonomous emergency braking system (10) may associate an AEB warning time with each of a plurality of intersections that are divided. If the determined inclination is classified into one of the plurality of sections, the autonomous emergency braking system (10) may identify an AEB warning time corresponding to the classified section. Here, for example, an AEB warning time corresponding to each of the sections may be set using a distance to an object (30) determined by the radar sensor as a reference.

The autonomous emergency braking system (10) may adjust an existing AEB warning time in accordance with the identified AEB warning time. Then, the autonomous emergency braking system (10) may perform control such that AEB braking is performed using the AEB warning time adjusted in accordance with the adjustment of the AEB warning time as a reference.

As described above, according to the present disclosure, the autonomous emergency braking system and the method can adjust an AEB warning time using a camera sensor such that collisions with objects are efficiently avoided in accordance with an inclination of a road surface for the objects such as a vehicle, a pedestrian, a bicycle, and a motor bicycle.

In addition, the present disclosure can perform a countermeasure using software in the case of limitation of the camera sensor in distance recognition according to the inclination. In accordance with this, in the case of limitation of the camera sensor, the present disclosure can recover the limitation by minimizing the AEB control.

Furthermore, the present disclosure can reduce incorrect warnings and control for objects located on a side face.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

10: autonomous emergency braking system
110: sensor
120: inclination determiner
130: controller

What is claimed is:

1. An autonomous emergency braking system comprising:
   a sensor that includes a gravity sensor detecting a force of gravity applied to a host vehicle and a vehicle-speed sensor detecting a vehicle speed of the host vehicle;
   an inclination determiner that determines an inclination of a road surface on which the host vehicle is traveling based on the vehicle speed of the host vehicle and the force of gravity; and
   a controller that adjusts an autonomous emergency braking (AEB) warning time based on the determined inclination of the road surface.

2. The autonomous emergency braking system according to claim 1,
   wherein the sensor further includes an image sensor that detects an object present in the vicinity of the host vehicle, and
   wherein the controller adjusts the AEB warning time in a case where a likelihood of a collision of the object with the host vehicle is equal to or higher than a threshold point.

3. The autonomous emergency braking system according to claim 1, wherein the controller adjusts the AEB warning time to be delayed further as the determined inclination of the road surface becomes higher.

4. The autonomous emergency braking system according to claim 1, wherein the controller adjusts the AEB warning time to be advanced further as the determined inclination of the road surface becomes lower.

5. The autonomous emergency braking system according to claim 1, wherein the controller classifies the determined inclination of the road surface into one of a plurality of inclination sections and performs adjustment to an AEB warning time corresponding to the classified section.

6. The autonomous emergency braking system according to claim 1, wherein the inclination is determined by comparing a value of the force of gravity detected by the gravity sensor with a differential value of the vehicle speed detected by the vehicle-speed sensor.

7. An autonomous emergency braking method comprising:
   detecting a force of gravity applied to a host vehicle and detecting a vehicle speed of the host vehicle;
   determining an inclination of a road surface on which the host vehicle is traveling based on the vehicle speed of the host vehicle and the force of gravity; and
   adjusting an autonomous emergency braking (AEB) warning time based on the determined inclination of the road surface.

8. The autonomous emergency braking method according to claim 7,
 wherein, in the detecting of a force of gravity and detecting of a vehicle speed, an object present in the vicinity of the host vehicle is further detected, and
 wherein, in the adjusting of an AEB warning time, the AEB warning time is adjusted in a case where a likelihood of a collision of the object with the host vehicle is equal to or higher than a threshold point.

9. The autonomous emergency braking method according to claim 7, wherein, in the adjusting of an AEB warning time, the AEB warning time is adjusted to be delayed further as the determined inclination of the road surface becomes higher.

10. The autonomous emergency braking method according to claim 7, wherein, in the adjusting of an AEB warning time, the AEB warning time is adjusted to be advanced further as the determined inclination of the road surface becomes lower.

11. The autonomous emergency braking method according to claim 7, wherein, in the adjusting of an AEB warning time, the determined inclination of the road surface is classified into one of a plurality of inclination sections, and adjustment to an AEB warning time corresponding to the classified section is performed.

12. The autonomous emergency braking method according to claim 7, wherein the inclination is determined by comparing a value of the force of gravity detected by the gravity sensor with a differential value of the vehicle speed detected by the vehicle-speed sensor.

\* \* \* \* \*